US012808320B2

(12) United States Patent
Sotero et al.

(10) Patent No.: US 12,808,320 B2
(45) Date of Patent: Nov. 24, 2026

(54) BRACKET ASSEMBLY DEVICE FOR CONNECTING PUMPS AND ALTERNATORS TO ENGINES

(71) Applicants: Adalberto L Sotero, Miami, FL (US); Mayra Achon Sotero, Miami, FL (US)

(72) Inventors: Adalberto L Sotero, Miami, FL (US); Mayra Achon Sotero, Miami, FL (US)

( * ) Notice: Subject to any disclaimer, the term of this patent is extended or adjusted under 35 U.S.C. 154(b) by 168 days.

(21) Appl. No.: 18/890,245

(22) Filed: Sep. 19, 2024

(65) Prior Publication Data

US 2026/0078696 A1 Mar. 19, 2026

(51) Int. Cl.
*F02B 63/04* (2006.01)
*F02B 67/06* (2006.01)

(52) U.S. Cl.
CPC ............ *F02B 63/042* (2013.01); *F02B 67/06* (2013.01)

(58) Field of Classification Search
CPC ............................... F02B 63/042; F02B 67/06
See application file for complete search history.

(56) References Cited

U.S. PATENT DOCUMENTS 5,810,321 A * 9/1998 Presson .................... F16M 7/00 417/362
5,938,169 A * 8/1999 Ogawa .................... F02B 67/06 123/195 A
6,244,239 B1 * 6/2001 Sisco .................... F02F 7/0073 123/195 A

* cited by examiner

*Primary Examiner* — Tulsidas C Patel
*Assistant Examiner* — Mohammed Ahmed Qureshi
(74) *Attorney, Agent, or Firm* — Carlos Adrian Zapatero; Allen F. Bennett

(57) ABSTRACT

A versatile bracket assembly device designed to securely connect alternators, pumps, and other mechanical components to various engines. The invention features two primary embodiments: a fixed bracket assembly and an adjustable bracket assembly. The fixed bracket assembly is ideal for applications where a single motor type is consistently used in a fixed space, with standardized motor dimensions and mounting configurations that do not require adjustments. The adjustable bracket assembly provides flexibility to accommodate different motor types and space constraints, making it suitable for varying configurations. In addition to connecting alternators, the bracket assembly supports hydraulic pumps, water pumps, compressors, and gearboxes, enabling engines to perform both mechanical and electrical functions. The invention also provides methods for securing engines to alternators, pumps, and other components using either the fixed or adjustable bracket assembly device.

11 Claims, 15 Drawing Sheets

BRACKET ASSEMBLY DEVICE FOR CONNECTING PUMPS AND ALTERNATORS TO ENGINES

FIELD OF THE INVENTION

The present invention relates generally to a bracket assembly device for engines. More specifically, it pertains to a versatile bracket assembly device for securely connecting alternators, pumps, and other mechanical components such as hydraulic pumps, compressors, and gearboxes to various engines.

BACKGROUND OF THE INVENTION

In the field of engine technology, there is an increasing need for efficient solutions that enable engines to connect to additional components, such as alternators and pumps, to support higher electrical loads. Traditionally, when more electrical power is required from an engine, the solution has often been to replace the existing engine with one of greater capacity. However, this approach is both costly and impractical, particularly in cases where only a stronger electrical connection is needed without the need to upgrade the entire engine.

To date, no effective bracket assembly has been developed to allow engines to connect to alternators and pumps in a way that supports additional electrical components without necessitating the installation of a new engine. Existing systems typically focus on dedicated engine types for specific uses and fail to provide a simple, adaptable solution for connecting engines to alternators and pumps across varying configurations.

As engines are increasingly tasked with powering more electrical systems, the demand for a versatile, cost-effective solution has grown. The prior art lacks a flexible system for securely connecting engines to alternators and pumps, which is essential for engines that must supply electrical power for a variety of applications. The absence of such a bracket assembly device has resulted in industries facing costly upgrades or extensive modifications to existing engines.

The present invention addresses this gap by introducing a versatile bracket assembly device that allows engines to be connected to alternators and pumps without the need for engine replacement. This invention offers two primary embodiments: a fixed bracket assembly, which is ideal for applications where the engine type and space are standardized, and an adjustable bracket assembly, designed for applications that require flexibility due to varying engine types or space constraints. This dual-embodiment design provides versatility and eliminates the need for expensive engine replacements, ensuring secure and adaptable mechanical connections.

Beyond connecting alternators, the bracket assembly is versatile enough to support additional mechanical components, including hydraulic pumps, water pumps, compressors, and gearboxes. This enables engines to perform multiple mechanical and electrical functions simultaneously, making the bracket essential in systems that require both types of power output. The bracket is compatible with a variety of engine types, including gasoline, diesel, electric motors, and hybrid engines, further enhancing its adaptability.

By solving the limitations of the prior art, the present invention provides a practical solution for supporting higher electrical loads through secure engine connections to alternators, pumps, and other components, using a flexible bracket assembly device that avoids the need for engine replacement.

BRIEF SUMMARY OF THE INVENTION

The present invention provides a versatile bracket assembly device designed to securely connect alternators and pumps to various engines. It features two main embodiments: a fixed bracket assembly and an adjustable bracket assembly.

The fixed bracket assembly is ideal for applications where a single motor type is consistently used within a fixed space, with standardized motor dimensions and mounting configurations that do not require adjustments. This assembly includes a fixed pump bracket, a fixed intermediate bracket, and an alternator bracket.

The adjustable bracket assembly is intended for applications involving various motor types and space constraints, where engine dimensions and mounting configurations are not standardized and require adjustments to the assembly. This embodiment includes an adjustable pump bracket, a pump bracket extension, an adjustable intermediate bracket, an intermediate bracket extension, and an alternator bracket, allowing for flexibility in connecting different engine configurations.

The invention also encompasses methods for securing an engine to an alternator and pump using either the fixed or adjustable bracket assemblies by aligning the components and securing them in place with fasteners, with the adjustable assembly allowing for different configurations

DETAILED DESCRIPTION OF THE INVENTION

The bracket assembly device 10 described herein is specifically designed for securely connecting alternators 11 and pumps 12 to engines 13, catering to the needs of different operational environments through its two preferred embodiments: the fixed bracket assembly 10A and the adjustable bracket assembly 10B.

Figure 1:
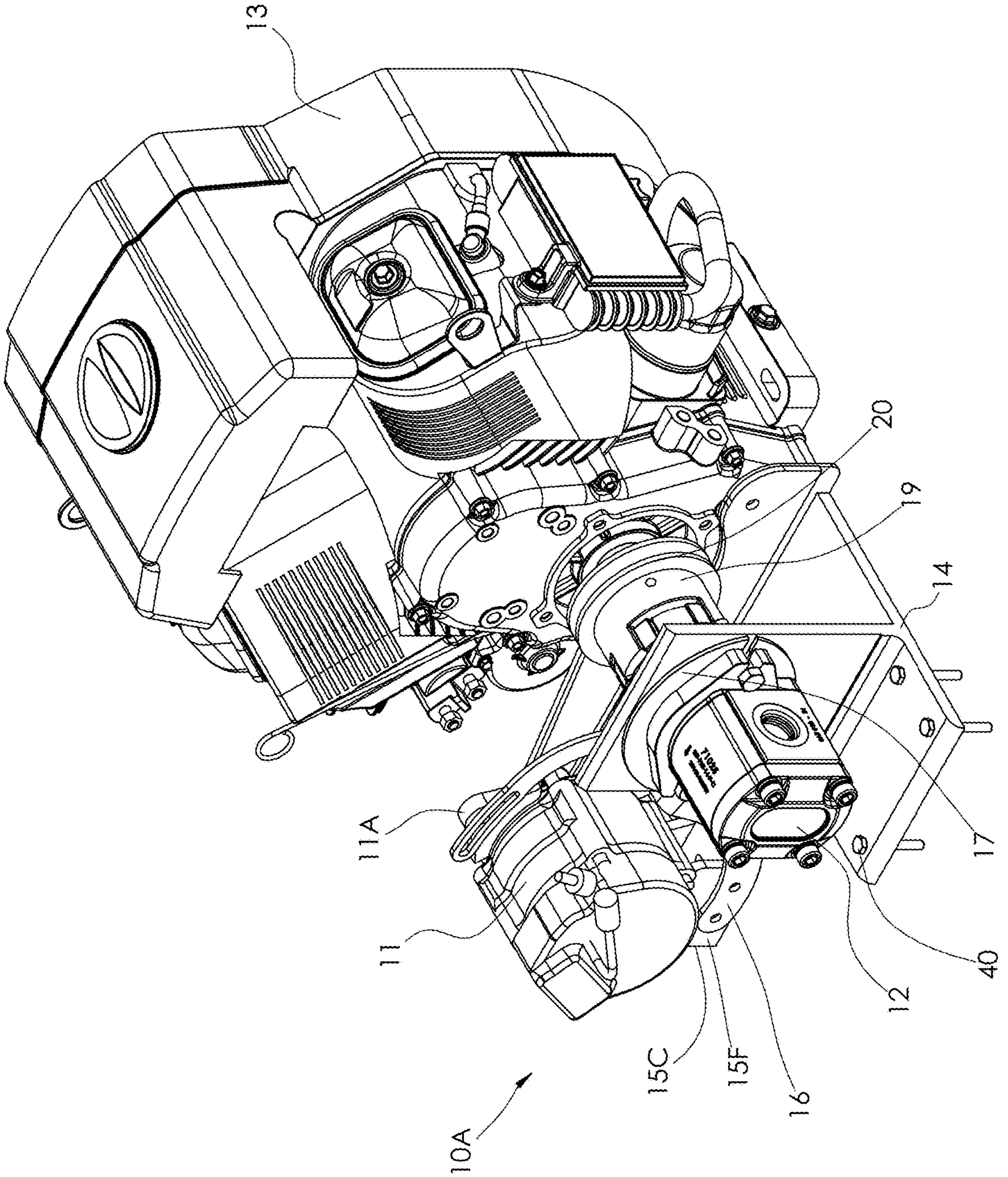
FIG. 1 is a perspective view of a bracket assembly device connected to an engine according to a first preferred embodiment of the invention.
Figure 2:
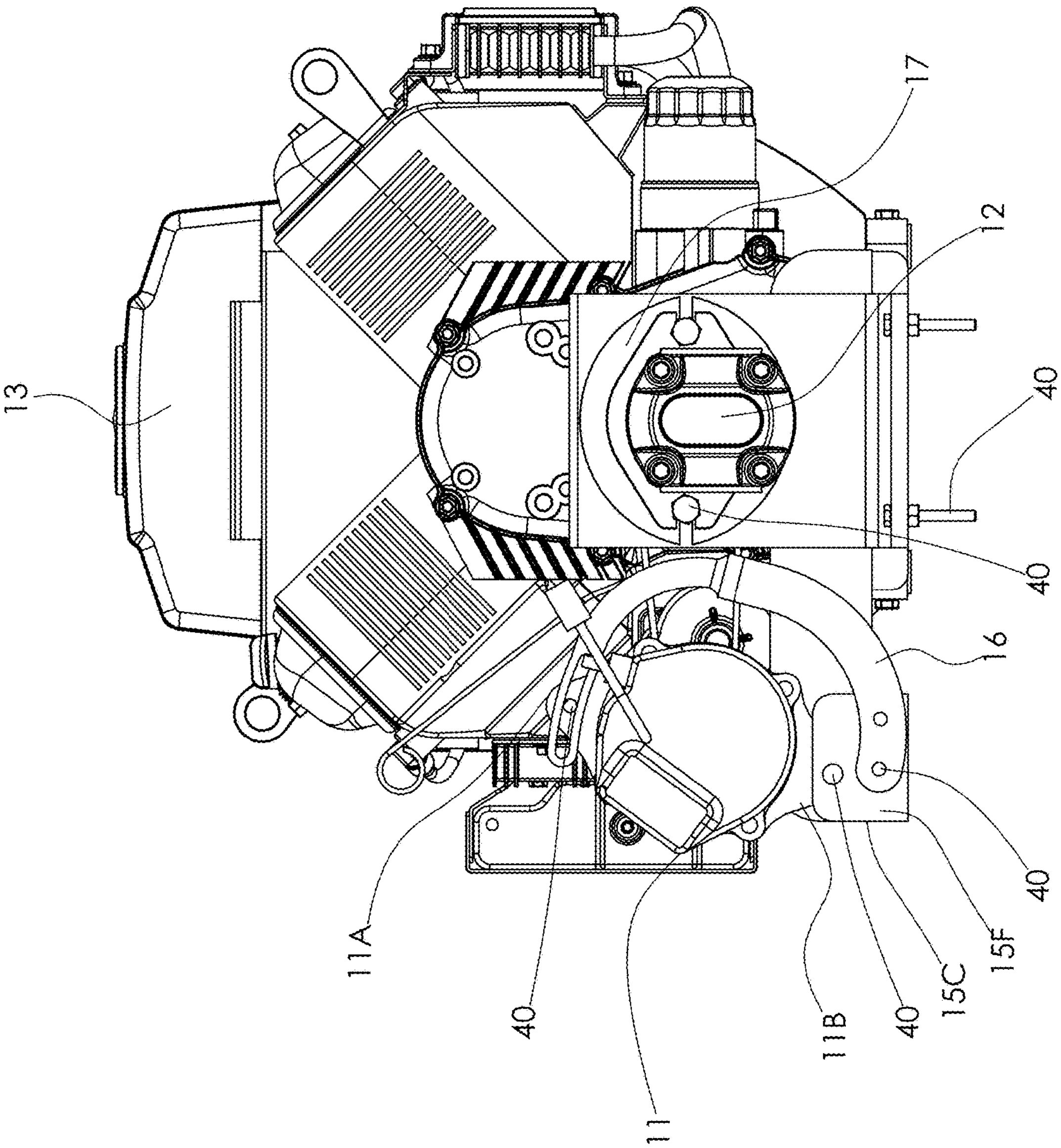
FIG. 2 is a front view of the bracket assembly device of FIG. 1.
Figure 3:
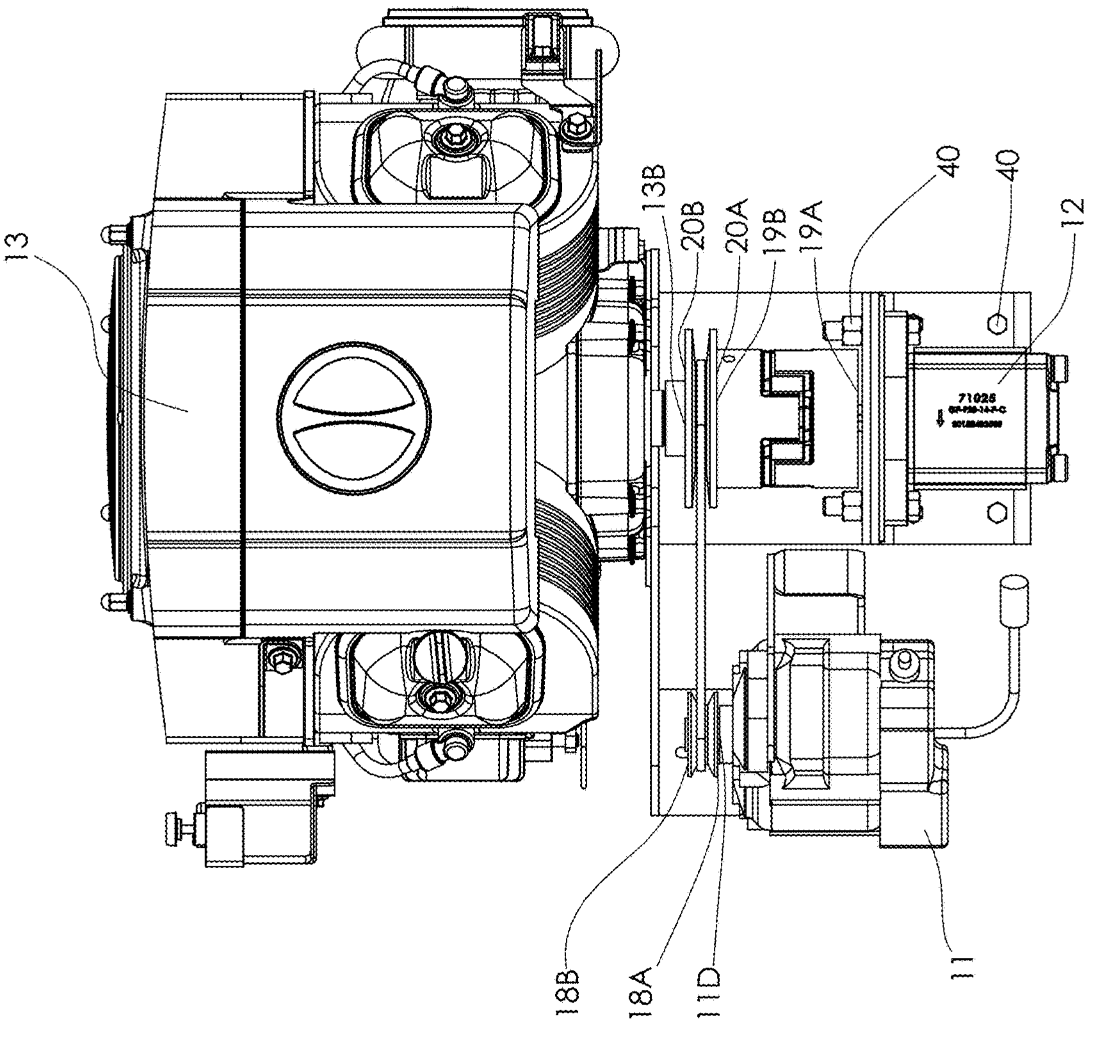
FIG. 3 is a top view of the bracket assembly device of FIG. 1.
Figure 4:
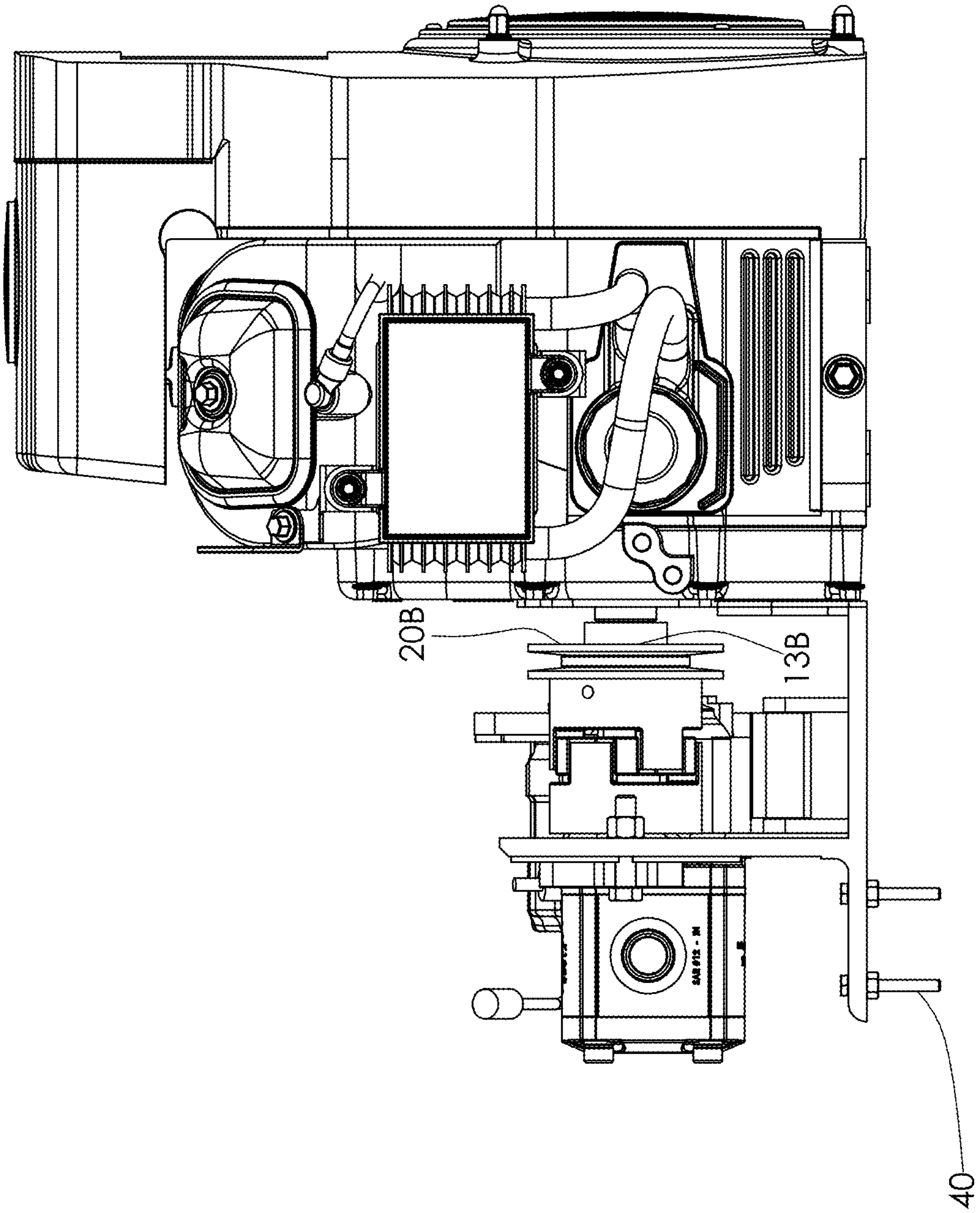
FIG. 4 is a side view of the bracket assembly device of FIG. 1.
Figure 5:
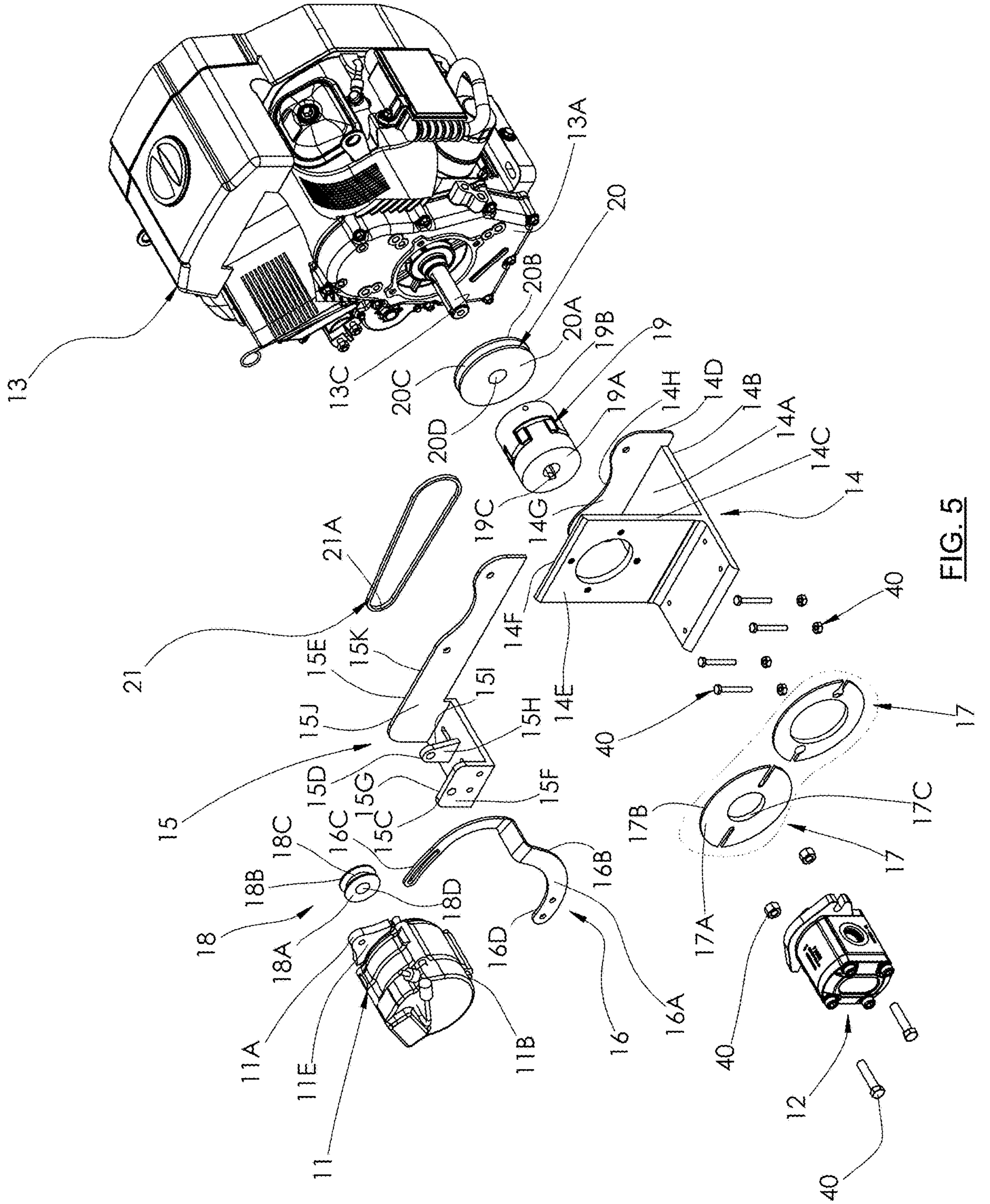
FIG. 5 is an exploded perspective view of the bracket assembly device of FIG. 1.
Figure 6:
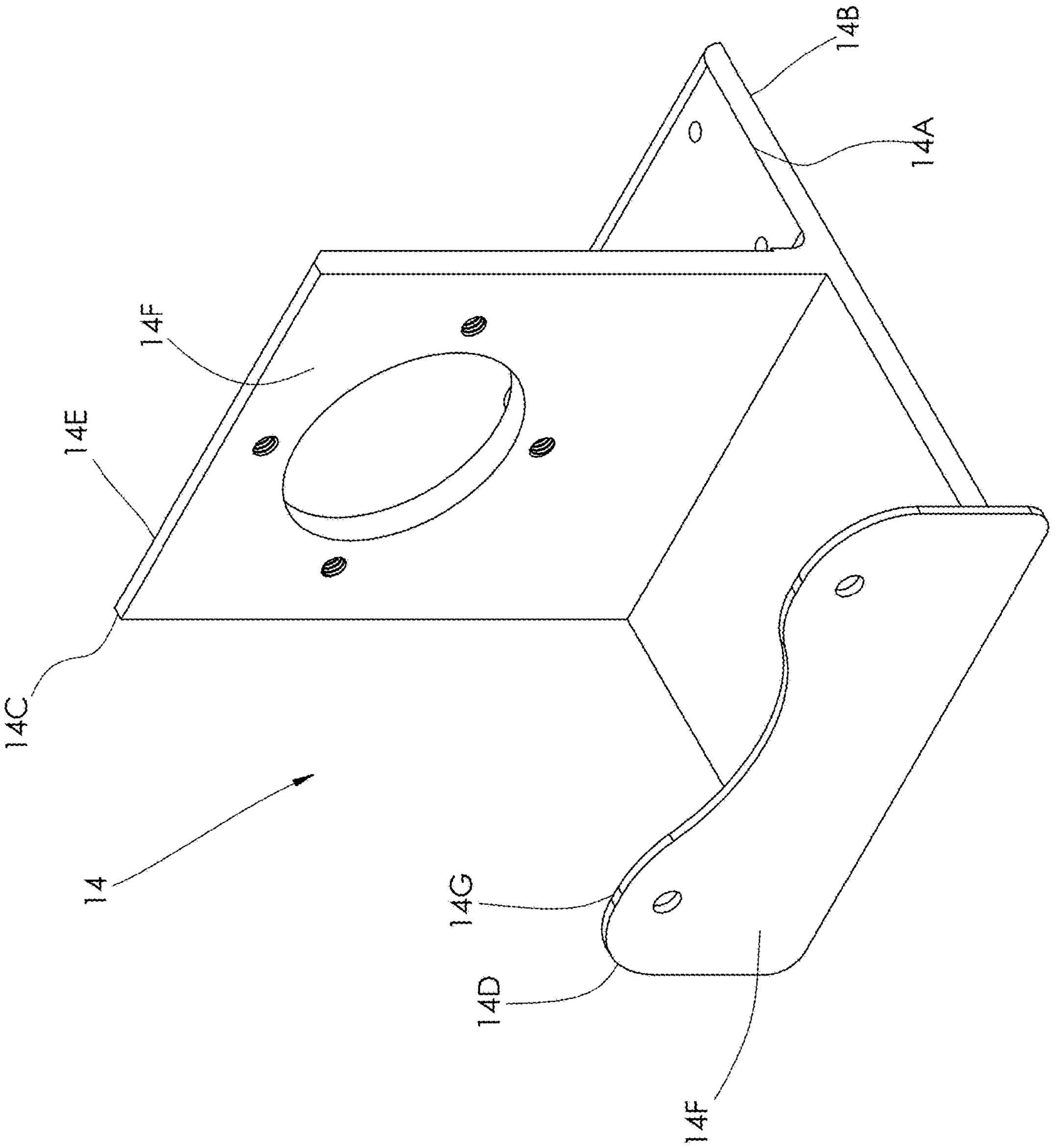
FIG. 6 is a perspective view of the fixed pump bracket of the bracket assembly device of FIG. 1.
Figure 7:
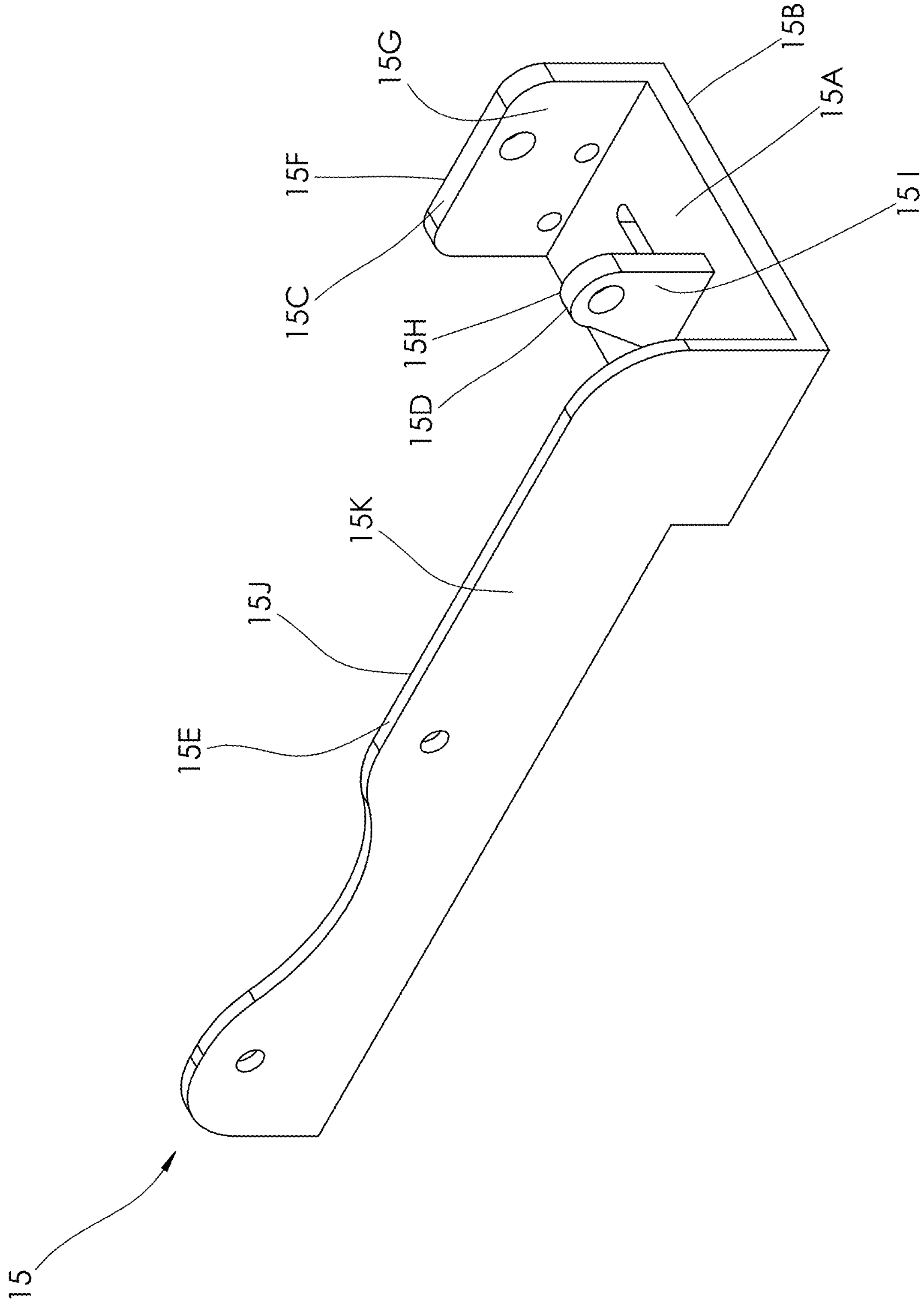
FIG. 7 is a perspective view of the fixed intermediate bracket of the bracket assembly device of FIG. 1.
Figure 8:
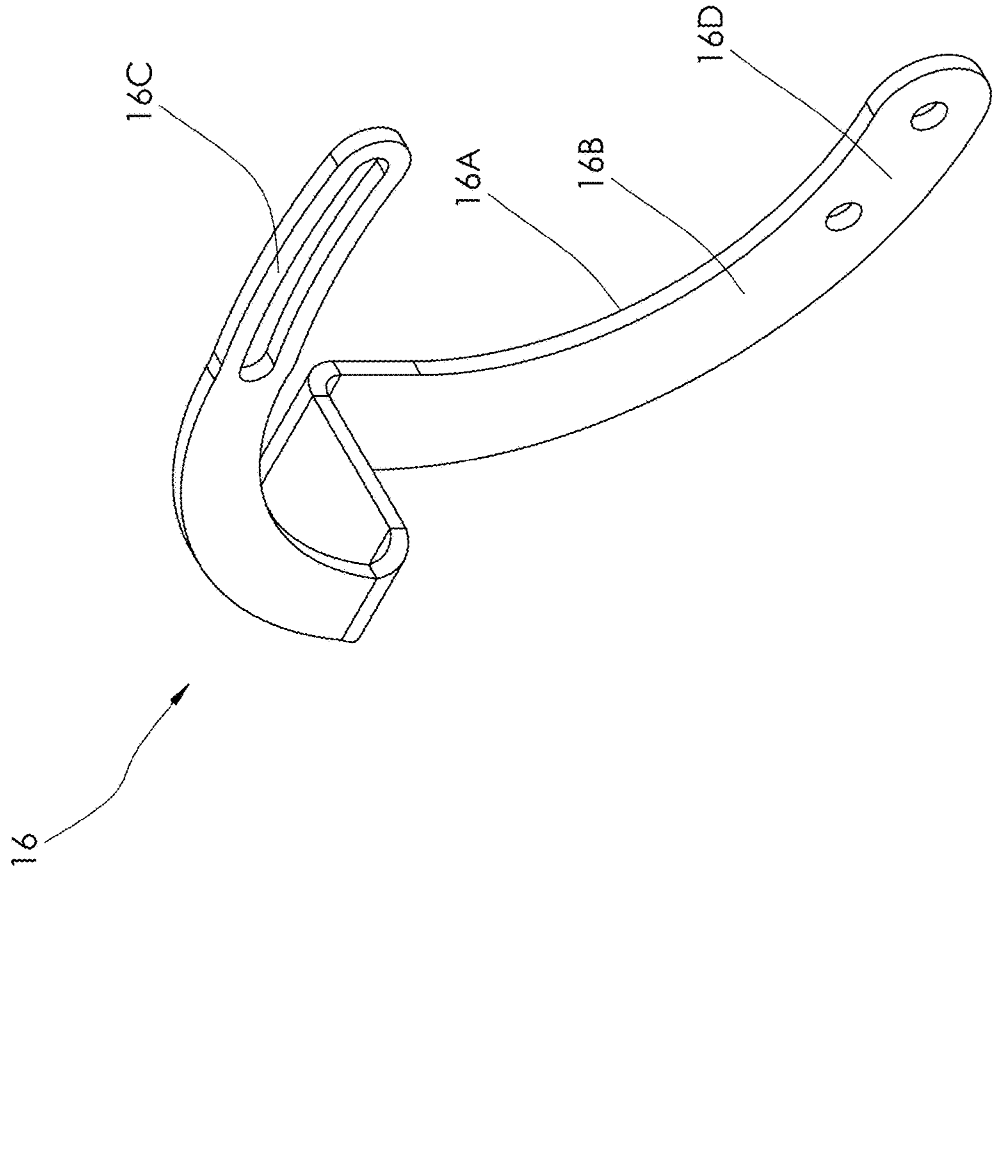
FIG. 8 is a perspective view of the alternator bracket of the bracket assembly device of FIG. 1.
Figure 9:
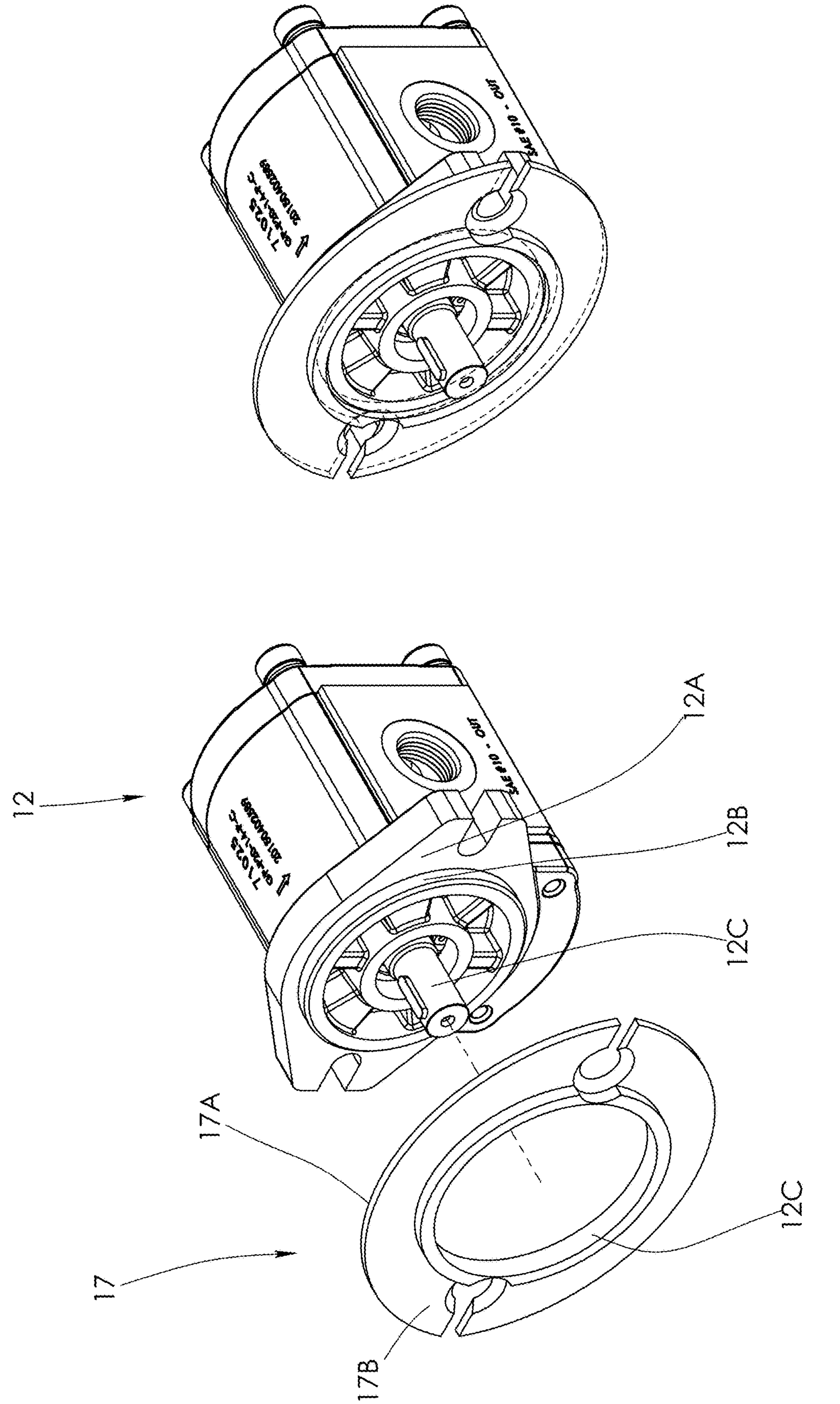
FIG. 9 is a perspective view of a pump of a bracket assembly device connected to a pump housing ring of a bracket assembly device.
Figure 10:
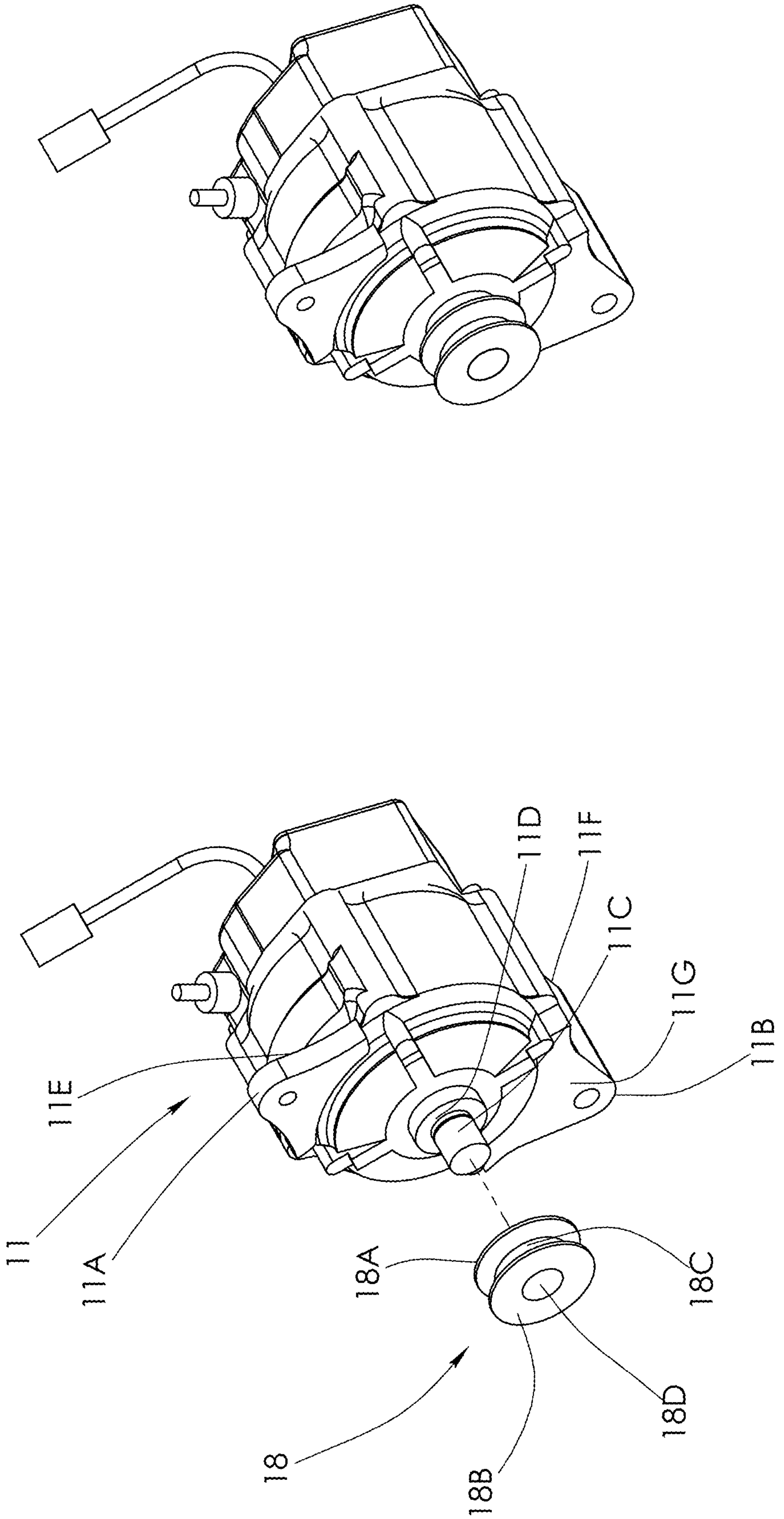
FIG. 10 is a perspective view of an alternator of a bracket assembly device connected to an alternator pulley of a bracket assembly device.
Figure 11:
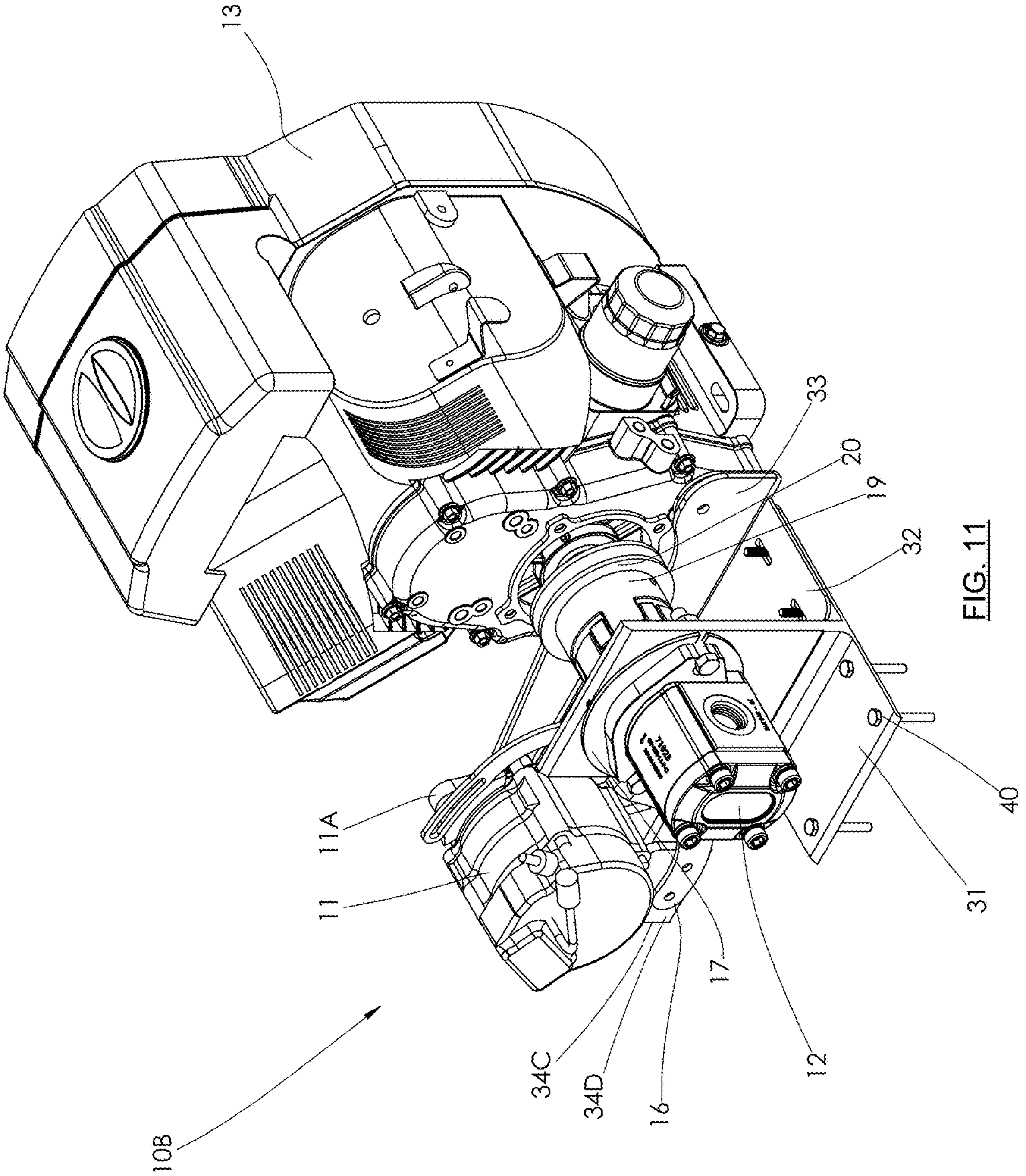
FIG. 11 is a perspective view of a bracket assembly device connected to an engine according to a second preferred embodiment of the invention.

FIGS. 1-11 show the first preferred embodiment 10A of the bracket assembly device 10. In the first preferred embodiment 10A, the device 10 is a fixed bracket assembly device 10A, comprising: an engine 13, pump 12, alternator 11, fixed pump bracket 14, fixed intermediate bracket 15, alternator bracket 16, pump housing ring 17, alternator pulley 18, coupling 19, motor pulley 20, and drive belt 21.

The engine 13 having a bracket end 13A, pulley side 13B, and drive shaft 13C. The pump 12 having a housing ring side 12A, exterior housing surface 12B, and rotating shaft 12C. The alternator 11 having a top end 11A, bottom end 11B, rotor shaft 11C, and pulley side 11D, said top end 11A of said alternator 11 having an alternator bracket side 11E, and said bottom end 11B of said alternator 11 having an alternator wall side 11F and adjustable middle wall side 11G.

The fixed pump bracket 14 having top surface 14A, bottom surface 14B, pump wall 14C, and motor wall 14D, said pump wall 14C having a pump side 14E and a coupling side 14F, said motor wall 14D having a fixed intermediate bracket side 14G and a motor side 14H, said motor side 14H of said motor wall 14D secured to said bracket end 13A of said engine 13 using fasteners 40, said bottom surface 14B of said fixed pump bracket 14 secured to a carrying surface 40. Secured means using fasteners 40, including bolts, screws, nails, rivets, washers, nuts, anchors, pins, clips, studs, U-bolts, threaded inserts, snap fasteners, cable ties, adhesive fasteners, and clamps, to fix the component in place. The carrying surface may include a metal base, plastic base, composite base, or ceramic base.

The fixed intermediate bracket 15 having a top surface 15A, bottom surface 15B, alternator wall 15C, adjustable middle wall 15D, and motor wall 15E, said alternator wall 15C having an alternator bracket side 15F and alternator side 15G, said adjustable middle wall 15D having an alternator side 15H and a free side 15I, and said motor wall 15E having a free side 15J and fixed pump bracket side 15K, said fixed pump bracket side 15K secured to said fixed intermediate bracket side 14G of said motor wall 14D of said fixed pump bracket 14.

The alternator bracket 16 having a free side 16A and connecting side 16B, said connecting side 16B of said alternator bracket 16 having an alternator end 16C and intermediate bracket end 16D, said alternator end 16C of said connecting side 16B of said alternator bracket 16 secured to said alternator bracket side 11E of said top end 11A of said alternator 11, said intermediate bracket end 16D of said connecting side 16B of said alternator bracket 16 secured to said alternator bracket side 15F of said alternator wall 15C of said fixed intermediate bracket 15, said alternator wall side 11F of said bottom end 11B of said alternator 11 secured to said alternator side 15G of said alternator wall 15C of said fixed intermediate bracket 15, and said adjustable middle wall side 11G of said bottom end 11B of said alternator 11 secured to said alternator side 15H of said adjustable middle wall 15D of said fixed intermediate bracket 15.

The pump housing ring 17 having a pump side 17A, bracket side 17B, and interior housing surface 17C, said interior housing surface 17C of said pump housing ring 17 connected to said exterior housing surface 12B of said pump 12, said pump side 17A of said pump housing ring 17 connected to said housing ring side 12A of said pump 12, said bracket side 17B of said pump housing ring 17 secured to said pump side 14E of said pump wall 14C of said fixed pump bracket 14. The pump housing ring 17 is capable of coming in various sizes so that the interior surface 17C of said pump housing ring 17 properly connects to the exterior housing surface 12B of said pump 12.

The alternator pulley 18 having an alternator side 18A, free side 18B, exterior drive belt surface 18C, and interior shaft surface 18D, said interior shaft surface 18D of said alternator pulley 18 connected to said rotor shaft 11C of said alternator 11, and said alternator side 18A of said alternator pulley 18 connected to said pulley side 11D of said alternator 11.

The motor pulley 20 having a coupling side 20A, engine side 20B, exterior drive belt surface 20C, and interior shaft surface 20D, said interior shaft surface 20D of said motor pulley 20 connected to said drive shaft 13C of said engine 13, and said engine side 20B of said motor pulley 20 connected to said pulley side 13B of said engine 13.

The coupling 19 having a pump side 19A, engine side 19B, and interior surface 19C, said interior surface 19C of said coupling 19 connected to said drive shaft 13C of said engine 13 and said rotating shaft 12C of said pump 12, said engine side 19B of said coupling 19 connected to said coupling side 20A of said motor pulley 20, and said pump side 19A of said coupling 19 connected to said coupling side 14F of said pump wall 14C of said fixed pump bracket 14.

The drive belt 21 having an interior pulley surface 21A, said interior pulley surface 21A of said drive belt 21 mounted to said exterior drive belt surface 18C of said alternator pulley 18 and said exterior drive belt surface 20C of said motor pulley 20.

Figure 12:
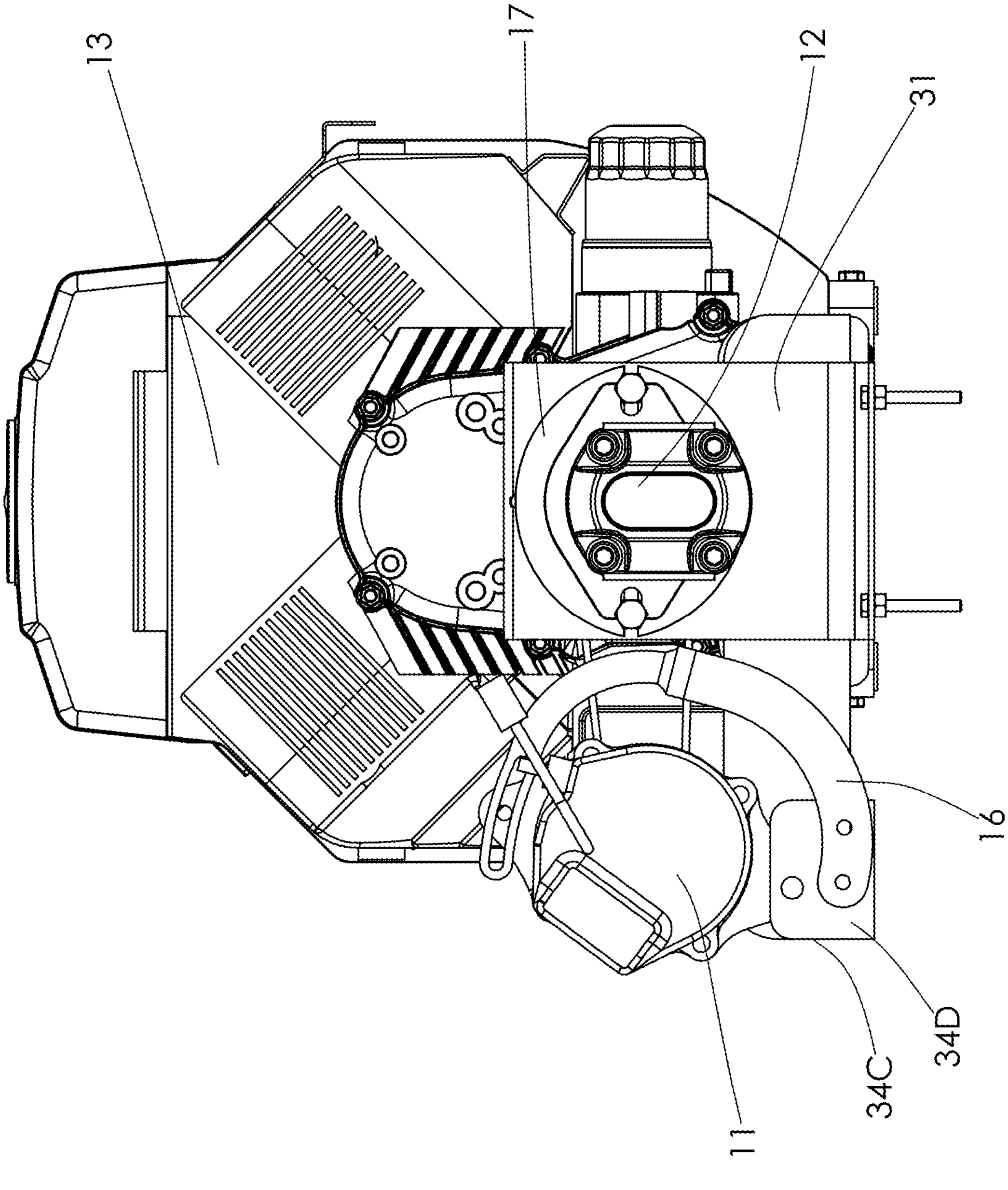
FIG. 12 is a front view of the bracket assembly device of FIG. 11.
Figure 13:
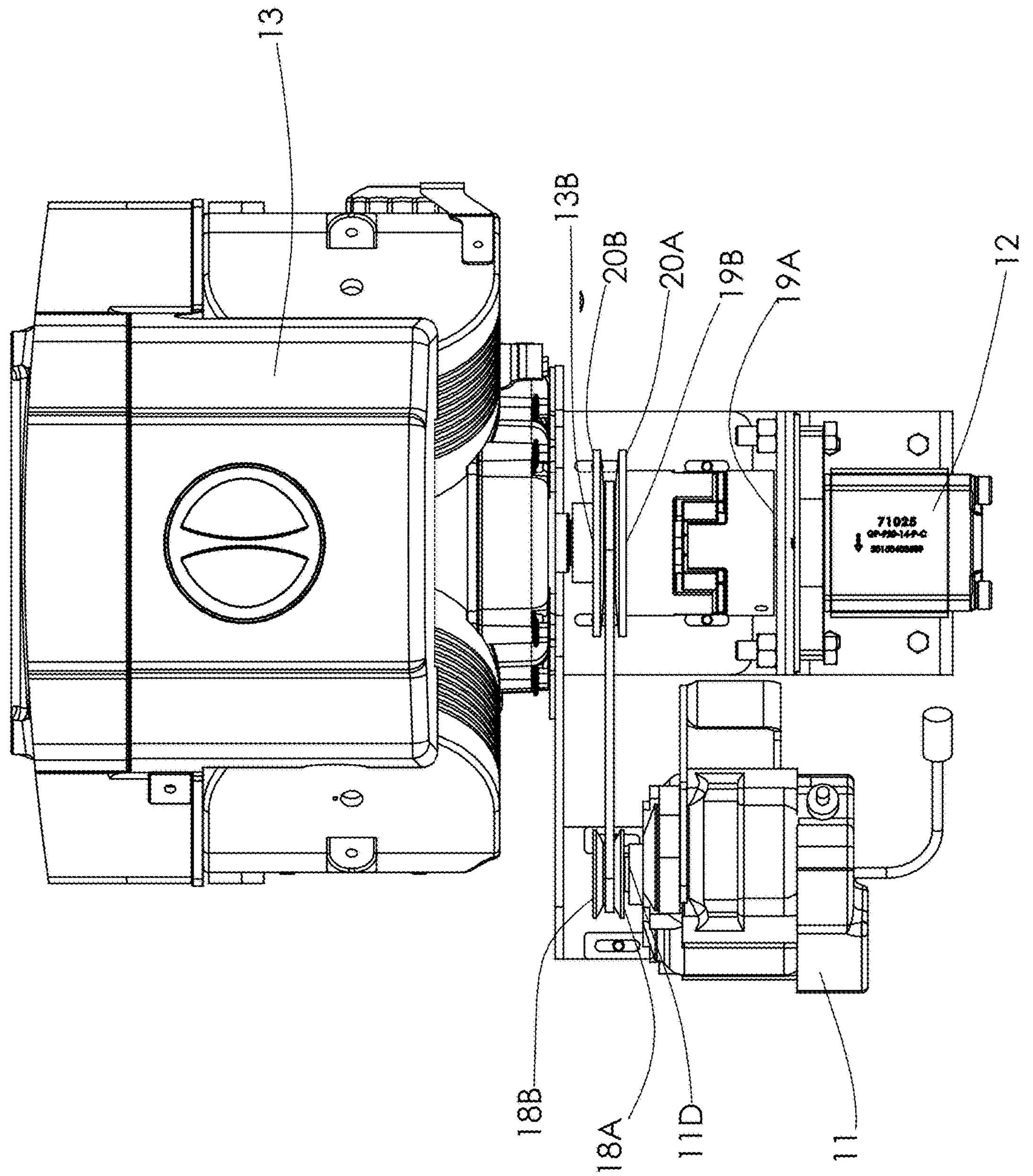
FIG. 13 is a top view of the bracket assembly device of FIG. 11.
Figure 14:
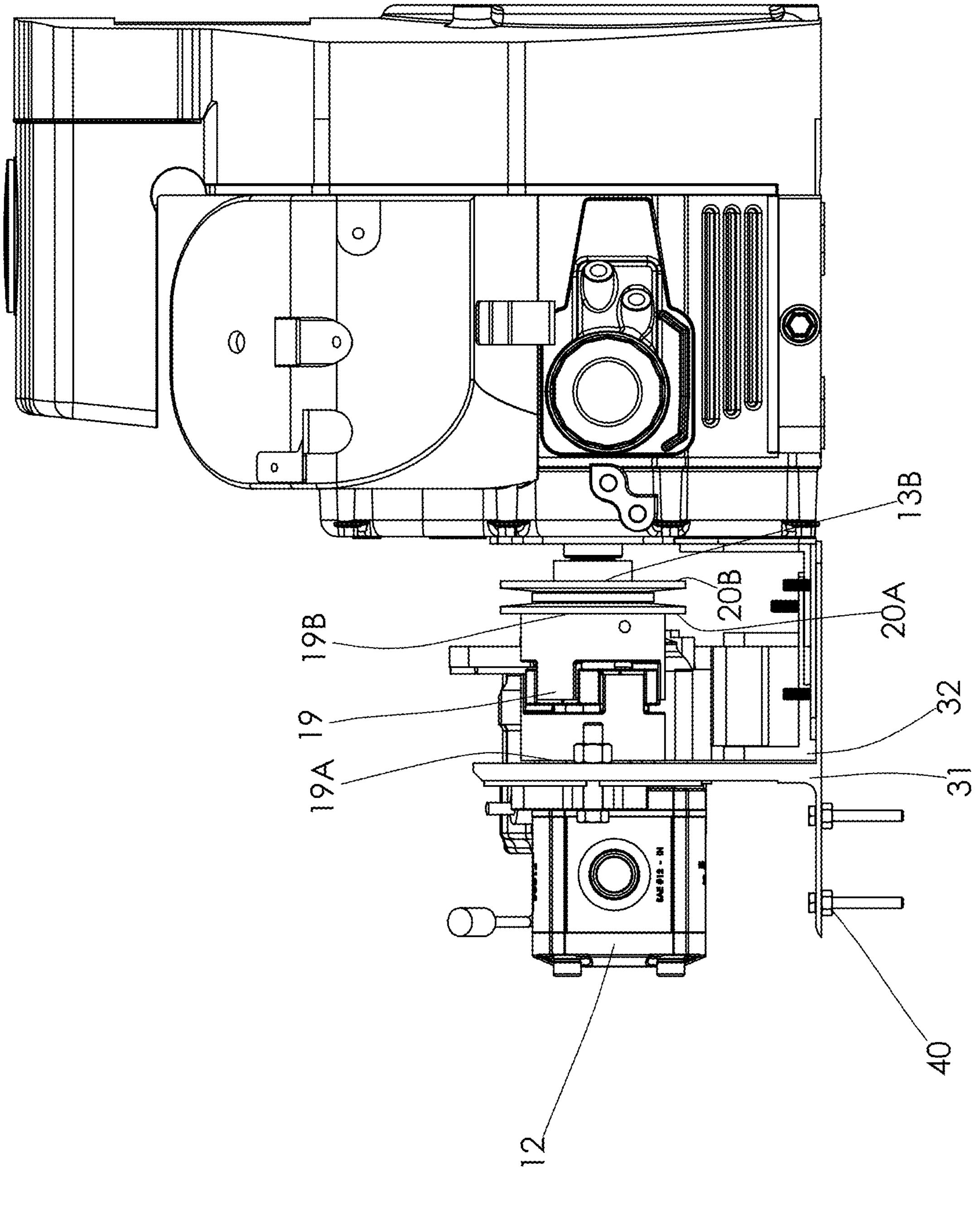
FIG. 14 is a side view of the bracket assembly device of FIG. 11.
Figure 15:
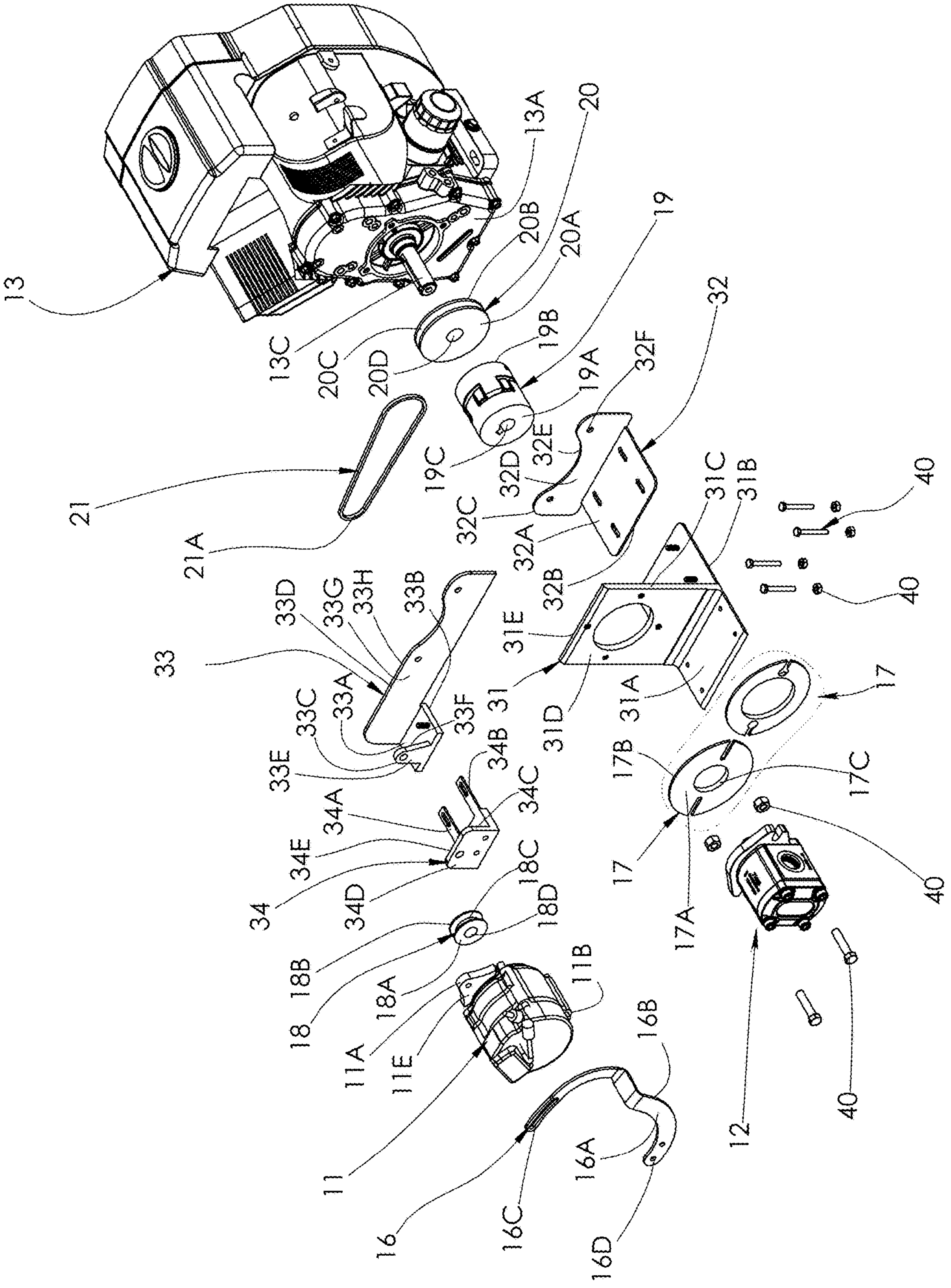
FIG. 15 is a perspective exploded view of the bracket assembly device of FIG. 11.

FIGS. 11-15 show the second preferred embodiment of the bracket assembly device 10B. In the second preferred embodiment 10B, the device 10 is an adjustable bracket assembly device 10B, comprising: an engine 13, pump 12, alternator 11, adjustable pump bracket 31, a pump bracket extension 32, an adjustable intermediate bracket 33, an intermediate bracket extension 34, an alternator bracket 16, pump housing ring 17, alternator pulley 18, coupling 19, motor pulley 20, and drive belt 21.

The engine 13 having a bracket end 13A, pulley side 13B, and drive shaft 13C. The pump 12 having a housing ring side 12A, exterior housing surface 12B, and rotating shaft 12C. The alternator 11 having a top end 11A, bottom end 11B, rotor shaft 11C, and pulley side 11D, said top end 11A of said alternator 11 having an alternator bracket side 11E, and said bottom end 11B of said alternator 11 having an alternator wall side 11F and adjustable middle wall side 11G.

The adjustable pump bracket 31 having a top surface 31A, bottom surface 31B, and pump wall 31C, said pump wall 31C having a pump side 31D and a coupling side 31E, and said bottom surface 31B of said adjustable pump bracket 31 secured to a carrying surface. The carrying surface may comprise a metal base, plastic base, composite base, or ceramic base. Secured means using fasteners 40, including bolts, screws, nails, rivets, washers, nuts, anchors, pins, clips, studs, U-bolts, threaded inserts, snap fasteners, cable ties, adhesive fasteners, and clamps, to fix the component in place. The carrying surface may include a metal base, plastic base, composite base, or ceramic base.

A pump bracket extension 32 having a top surface 32A, bottom surface 32B, and motor wall 32C, said motor wall 32C having an adjustable intermediate bracket side 32D and a motor side 32E, said motor side 32E of said motor wall 32C of said pump bracket extension 32 secured to said bracket end 13A of said engine 13, and said bottom surface 32B of said pump bracket extension 32 is secured to said top surface 31A of said adjustable pump bracket 31.

An adjustable intermediate bracket 33 having a top surface 33A, bottom surface 33B, adjustable middle wall 33C, and motor wall 33D, said adjustable middle wall 33C of said adjustable intermediate bracket 33 having an alternator side 33E and free side 33F, and said motor wall 33D of said adjustable intermediate bracket 33 having a free side 33G and pump bracket extension side 33H, and said pump bracket extension side 33H of said motor wall 33D of said adjustable intermediate bracket 33 secured to said adjustable intermediate bracket side 32D of said motor wall 32C of said pump bracket extension 32.

An intermediate bracket extension 34 having a top surface 34A, bottom surface 34B, alternator wall 34C, said alternator wall 34C of said intermediate bracket extension 34 having an alternator bracket side 34D and alternator side 34E, said bottom surface 34B of said intermediate bracket extension 34 secured to said top surface 33A of said adjustable intermediate bracket 33.

An alternator bracket 16 having a free side 16A and connecting side 16B, said connecting side 16B of said alternator bracket 16 having an alternator end 16C and intermediate bracket end 16D, said alternator end 16C of said connecting side 16B of said alternator bracket 16 secured to said alternator bracket side 11E of said top end 11A of said alternator 11, said intermediate bracket end 16D of said connecting side 16B of said alternator bracket 16 secured to said alternator bracket side 34D of said alternator wall 34C of said intermediate bracket extension 34, said alternator wall side 11F of said bottom end 11B of said alternator 11 secured to said alternator side 34E of said alternator wall 34C of said intermediate bracket extension 34, and said adjustable middle wall side 11G of said bottom end 11B of said alternator 11 secured to said alternator side 33E of said adjustable middle wall 33C of said adjustable intermediate bracket 33.

The pump housing ring 17 having a pump side 17A, bracket side 17B, and interior housing surface 17C, said interior housing surface 17C of said pump housing ring 17 connected to said exterior housing surface 12B of said pump 12, said pump side 17A of said pump housing ring 17 connected to said housing ring side 12A of said pump 12, said bracket side 17B of said pump housing ring 17 secured to said pump side 31D of said pump wall 31C of said adjustable pump bracket 31.

The alternator pulley 18 having an alternator side 18A, free side 18B, exterior drive belt surface 18C, and interior shaft surface 18D, said interior shaft surface 18D of said alternator pulley 18 connected to said rotor shaft 11C of said alternator 11, and said alternator side 18A of said alternator pulley 18 connected to said pulley side 11D of said alternator 11.

The motor pulley 20 having a coupling side 20A, engine side 20B, exterior drive belt surface 20C, and interior shaft surface 20D, said interior shaft surface 20D of said motor pulley 20 connected to said drive shaft 13C of said engine 13, and said engine side 20B of said motor pulley 20 connected to said pulley side 13B of said engine 13.

The coupling 19 having a pump side 19A, engine side 19B, and interior surface 19C, said interior surface 19C of said coupling 19 connected to said drive shaft 13C of said engine 13 and said rotating shaft 12C of said pump 12, said engine side 19B of said coupling 19 connected to said coupling side 20A of said motor pulley 20, and said pump side 19A of said coupling 19 connected to said coupling side 31E of said pump wall 31C of said adjustable pump bracket 31.

The drive belt 21 having an interior pulley surface 21A, said interior pulley surface 21A of said drive belt 21 mounted to said exterior drive belt surface 18C of said alternator pulley 18 and said exterior drive belt surface 20C of said motor pulley 20.

For the fixed bracket assembly device 10A, the fixed pump bracket 14, fixed intermediate bracket 15, alternator bracket 16, pump housing ring 17, alternator pulley 18, coupling 19, and motor pulley 20 may be made of metal, plastic, composite, or ceramic, or any alloy thereof. For the adjustable bracket assembly device 10B, the adjustable pump bracket 31, pump bracket extension 32, adjustable intermediate bracket 33, intermediate bracket extension 34, alternator bracket 16, pump housing ring 17, alternator pulley 18, coupling 19, and motor pulley 20 may also be made of metal, plastic, composite, or ceramic, or any alloy thereof.

The engine 13 of the bracket assembly device 10 may be a gasoline engine, a diesel engine, an electric engine, a hybrid engine, or a natural gas engine. The pump 12 of the bracket assembly device 10 may be a gear pump, hydraulic pump, centrifugal pump, diaphragm pump, piston pump, peristaltic pump, screw pump, or vacuum pump. The alternator 11 of the bracket assembly device 10 may be a standard automotive alternator, brushless alternator, or permanent magnet alternator, or a high-output alternator.

The carrying surface of the bracket assembly device 10 may be any flat surface suitable for carrying a heavy load, including a metal base, plastic base, composite base, or ceramic base. The drive belt 21 of the bracket assembly device 10 may be a V-belt, timing belt, or serpentine belt, and may be made of rubber, polymer, reinforced composite, fabric, or any other durable materials known in the art.

Both the fixed bracket assembly device 10A and the adjustable bracket assembly device 10B may be manufactured using any suitable process known in the art.

The invention also encompasses a method of securing an engine 13 to an alternator 11 and pump 12 using a fixed bracket assembly device 10A, comprising: providing a fixed bracket assembly device 10A comprising an engine 13, pump 12, alternator 11, fixed pump bracket 14, fixed intermediate bracket 15, alternator bracket 16, pump housing ring 17, alternator pulley 18, coupling 19, motor pulley 20, and drive belt 21; aligning the engine 13 with the alternator 11 and pump 12 using the fixed bracket assembly 10A to ensure proper mechanical engagement; and securing the engine 13, alternator 11, and pump 12 using fasteners 40 to lock the fixed pump bracket 14, fixed intermediate bracket 15, and alternator bracket 16 in place.

The invention also encompasses a method of securing an engine 13 to an alternator 11 and pump 12 using an adjustable bracket assembly device 10B, comprising: providing an adjustable bracket assembly device 10B comprising an engine 13, pump 12, alternator 11, adjustable pump bracket 31, pump bracket extension 32, adjustable intermediate bracket 33, intermediate bracket extension 34, alternator bracket 16, pump housing ring 17, alternator pulley 18, coupling 19, motor pulley 20, and drive belt 21; aligning the engine 13 with the alternator 11 and pump 12 using the adjustable bracket assembly 10B to ensure proper mechanical engagement; and securing the engine 13, alternator 11, and pump 12 using fasteners 40 to lock the adjustable pump bracket 31, pump bracket extension 32, adjustable intermediate bracket 33, intermediate bracket extension 34, and alternator bracket 16 in place.

The best mode currently contemplated by the inventor for carrying out the invention involves using the bracket assembly device 10 to connect a gas engine 13 to both an alternator 11 and a hydraulic pump 12. This configuration allows the gas engine 13 to support a larger electrical and mechanical load by efficiently distributing power between the alternator 11 and the hydraulic pump 12. The fixed and adjustable components of the bracket assembly device 10 ensure a secure fit, even with varying engine sizes and mounting positions, thereby optimizing the performance of the engine and the connected components in high-demand applications.

From the above disclosure of the detailed description of the present invention and the preceding summary of the preferred embodiments, those skilled in the art will comprehend the various modifications to which the present invention is susceptible. Therefore, I desire to be limited only by the scope of the following claims and equivalents thereof.

What is claimed is:

1. A fixed bracket assembly device, comprising:

an engine having a bracket end, pulley side, and drive shaft;

a pump having a housing ring side, exterior housing surface, and rotating shaft;

an alternator having a top end, bottom end, rotor shaft, and pulley side, said top end of said alternator having an alternator bracket side, and said bottom end of said alternator having an alternator wall side and adjustable middle wall side;

a fixed pump bracket having top surface, bottom surface, pump wall, and motor wall, said pump wall having a pump side and a coupling side, said motor wall having a fixed intermediate bracket side and a motor side, said motor side of said motor wall secured to said bracket end of said engine, said bottom surface of said fixed pump bracket secured to a carrying surface;

a fixed intermediate bracket having a top surface, bottom surface, alternator wall, adjustable middle wall, and motor wall, said alternator wall having an alternator bracket side and alternator side, said adjustable middle wall having an alternator side and a free side, and said motor wall having a free side and fixed pump bracket side, said fixed pump bracket side secured to said fixed intermediate bracket side of said motor wall of said fixed pump bracket;

an alternator bracket having a free side and connecting side, said connecting side of said alternator bracket having an alternator end and intermediate bracket end, said alternator end of said connecting side of said alternator bracket secured to said alternator bracket side of said top end of said alternator, said intermediate bracket end of said connecting side of said alternator bracket secured to said alternator bracket side of said alternator wall of said fixed intermediate bracket, said alternator wall side of said bottom end of said alternator secured to said alternator side of said alternator wall of said fixed intermediate bracket, and said adjustable middle wall side of said bottom end of said alternator secured to said alternator side of said adjustable middle wall of said fixed intermediate bracket;

a pump housing ring having a pump side, bracket side, and interior housing surface, said interior housing surface of said pump housing ring connected to said exterior housing surface of said pump, said pump side of said pump housing ring connected to said housing ring side of said pump, said bracket side of said pump housing ring secured to said pump side of said pump wall of said fixed pump bracket;

an alternator pulley having an alternator side, free side, exterior drive belt surface, and interior shaft surface, said interior shaft surface of said alternator pulley connected to said rotor shaft of said alternator, and said alternator side of said alternator pulley connected to said pulley side of said alternator;

a motor pulley having a coupling side, engine side, exterior drive belt surface, and interior shaft surface, said interior shaft surface of said motor pulley connected to said drive shaft of said engine, and said engine side of said motor pulley connected to said pulley side of said engine;

a coupling having a pump side, engine side, and interior surface, said interior surface of said coupling connected to said drive shaft of said engine and said rotating shaft of said pump, said engine side of said coupling connected to said coupling side of said motor pulley, and said pump side of said coupling connected to said coupling side of said pump wall of said fixed pump bracket; and a drive belt having an interior pulley surface, said interior pulley surface of said drive belt mounted to said exterior drive belt surface of said alternator pulley and said exterior drive belt surface of said motor pulley.

2. The fixed bracket assembly device as in claim 1, in which the fixed pump bracket, fixed intermediate bracket, alternator bracket, pump housing ring, alternator pulley, motor pulley, and coupling are made of a material selected from the group consisting of metal, plastic, composite, or ceramic, or any alloy thereof.

3. An adjustable bracket assembly device, comprising:

an engine having a bracket end, pulley side, and drive shaft;

a pump having a housing ring side, exterior housing surface, and rotating shaft;

an alternator having a top end, bottom end, rotor shaft, and pulley side, said top end of said alternator having an alternator bracket side, and said bottom end of said alternator having an alternator wall side and adjustable middle wall side;

an adjustable pump bracket having a top surface, bottom surface, and pump wall, said pump wall having a pump side and a coupling side, and said bottom surface of said adjustable pump bracket secured to a carrying surface;

a pump bracket extension having a top surface, bottom surface, and motor wall, said motor wall having an adjustable intermediate bracket side and a motor side, said motor side of said motor wall of said pump bracket extension secured to said bracket end of said engine, and said bottom surface of said pump bracket extension is secured to said top surface of said adjustable pump bracket;

an adjustable intermediate bracket having a top surface, bottom surface, adjustable middle wall, and motor wall, said adjustable middle wall of said adjustable intermediate bracket having an alternator side and a free side, and said motor wall of said adjustable intermediate bracket having a free side and pump bracket extension side, and said pump bracket extension side of said motor wall of said adjustable intermediate bracket secured to said adjustable intermediate bracket side of said motor wall of said pump bracket extension;

an intermediate bracket extension having a top surface, bottom surface, alternator wall, said alternator wall having an alternator bracket side and alternator side, said bottom surface of said intermediate bracket extension secured to said top surface of said adjustable intermediate bracket;

an alternator bracket having a free side and connecting side, said connecting side of said alternator bracket having an alternator end and intermediate bracket end, said alternator end of said connecting side of said alternator bracket secured to said alternator bracket side of said top end of said alternator, said intermediate bracket end of said connecting side of said alternator bracket secured to said alternator bracket side of said alternator wall of said intermediate bracket extension, said alternator wall side of said bottom end of said alternator secured to said alternator side of said alternator wall of said intermediate bracket extension, and said adjustable middle wall side of said bottom end of said alternator secured to said alternator side of said adjustable middle wall of said adjustable intermediate bracket;

a pump housing ring having a pump side, bracket side, and interior housing surface, said interior housing surface of said pump housing ring connected to said exterior housing surface of said pump, said pump side of said pump housing ring connected to said housing ring side of said pump, said bracket side of said pump housing ring secured to said pump side of said pump wall of said adjustable pump bracket;

an alternator pulley having an alternator side, free side, exterior drive belt surface, and interior shaft surface, said interior shaft surface of said alternator pulley connected to said rotor shaft of said alternator, and said alternator side of said alternator pulley connected to said pulley side of said alternator;

a motor pulley having a coupling side, engine side, exterior drive belt surface, and interior shaft surface, said interior shaft surface of said motor pulley connected to said drive shaft of said engine, and said engine side of said motor pulley connected to said pulley side of said engine;

a coupling having a pump side, engine side, and interior surface, said interior surface of said coupling connected to said drive shaft of said engine and said rotating shaft of said pump, said engine side of said coupling connected to said coupling side of said motor pulley, and said pump side of said coupling connected to said coupling side of said pump wall of said adjustable pump bracket; and a drive belt having an interior pulley surface, said interior pulley surface of said drive belt mounted to said exterior drive belt surface of said alternator pulley and said exterior drive belt surface of said motor pulley.

4. The adjustable bracket assembly device as in claim 3, in which the adjustable pump bracket, pump bracket extension, adjustable intermediate bracket, intermediate bracket extension, alternator bracket, pump housing ring, alternator pulley, motor pulley, and coupling are made of a material selected from the group consisting of metal, plastic, composite, or ceramic, or any alloy thereof.

5. The bracket assembly device of claim 1 or 3, wherein the engine is selected from the group consisting of a gasoline engine, a diesel engine, an electric engine, a hybrid engine, or a natural gas engine.

6. The bracket assembly device of claim 5, wherein the pump is selected from the group consisting of a gear pump, hydraulic pump, centrifugal pump, diaphragm pump, piston pump, peristaltic pump, screw pump, or vacuum pump.

7. The bracket assembly device of claim 6, wherein the alternator is selected from the group consisting of a standard automotive alternator, brushless alternator, or permanent magnet alternator, or a high-output alternator.

8. The bracket assembly device of claim 7, wherein the carrying surface is selected from the group consisting of a metal base, plastic base, composite base, or ceramic base.

9. The bracket assembly device of claim 8, in which the drive belt is selected from the group consisting of a V-belt, timing belt, or serpentine belt, and is made of a material selected from rubber, polymer, or reinforced composite.

10. A method of securing an engine to an alternator and pump using a fixed bracket assembly device, comprising:

providing a fixed bracket assembly device comprising an engine, pump, alternator, fixed pump bracket, fixed intermediate bracket, alternator bracket, pump housing ring, alternator pulley, coupling, motor pulley, and drive belt;

aligning the engine with the alternator and pump using the fixed bracket assembly to ensure proper mechanical engagement; and securing the engine, alternator, and pump using fasteners to lock the fixed pump bracket, fixed intermediate bracket, and alternator bracket in place.

11. A method of securing an engine to an alternator and pump using an adjustable bracket assembly device, comprising:

providing an adjustable bracket assembly device comprising an engine, a pump, an alternator, an adjustable pump bracket, a pump bracket extension, an adjustable intermediate bracket, an intermediate bracket extension, an alternator bracket, a pump housing ring, an alternator pulley, a coupling, a motor pulley, and a drive belt;

aligning the engine with the alternator and pump using the adjustable bracket assembly to ensure proper mechanical engagement; and securing the engine, alternator, and pump using fasteners to lock the adjustable pump bracket, pump bracket extension, adjustable intermediate bracket, intermediate bracket extension, and alternator bracket in place.

* * * * *